(12) United States Patent
Berlin et al.

(10) Patent No.: US 11,618,183 B2
(45) Date of Patent: Apr. 4, 2023

(54) PROCESS AND DEVICE FOR THE PRODUCTION OF A FIBER-COMPOSITE MATERIAL

(71) Applicant: Evonik Operations GmbH, Essen (DE)

(72) Inventors: Mark Reinhard Berlin, Esslingen (DE); Udo Sondermann, Dorsten (DE)

(73) Assignee: Evonik Operations GmbH, Essen (DE)

( * ) Notice: Subject to any disclaimer, the term of this patent is extended or adjusted under 35 U.S.C. 154(b) by 408 days.

(21) Appl. No.: 15/569,460

(22) PCT Filed: Apr. 19, 2016

(86) PCT No.: PCT/EP2016/058636
§ 371 (c)(1),
(2) Date: Oct. 26, 2017

(87) PCT Pub. No.: WO2016/173886
PCT Pub. Date: Nov. 3, 2016

(65) Prior Publication Data
US 2018/0297239 A1    Oct. 18, 2018

(30) Foreign Application Priority Data

Apr. 30, 2015  (EP) ..................... 15165851

(51) Int. Cl.
*B29B 15/12*  (2006.01)
*B29B 9/14*   (2006.01)
*B29C 43/24*  (2006.01)

(52) U.S. Cl.
CPC ............. *B29B 15/122* (2013.01); *B29B 9/14* (2013.01); *B29C 43/24* (2013.01)

(58) Field of Classification Search
CPC ... B29B 15/122; B29B 15/125; B29B 15/127; B29C 70/52; B29C 70/521; D02J 1/18
See application file for complete search history.

(56) References Cited

U.S. PATENT DOCUMENTS 5,135,827 A * 8/1992 Bohm ..................... B29C 31/04
430/30
5,869,178 A * 2/1999 Kusy ..................... B29B 15/122
428/335

(Continued)

FOREIGN PATENT DOCUMENTS

CN         102601887 A      7/2012
DE   10 2013 227 173 A1    7/2014

(Continued)

OTHER PUBLICATIONS

Lu, Zhihong, English translation of CN102601887 (B), Feb. 25, 2015 (Year: 2015).*

(Continued)

*Primary Examiner* — Matthew J Daniels
*Assistant Examiner* — Gregory C. Grosso
(74) *Attorney, Agent, or Firm* — Oblon, McClelland, Maier & Neustadt, L.L.P.

(57) ABSTRACT

A process for the production of a fibre-composite material, the process including the following steps: a) a fibre bundle is conducted over at least one deflection bar having radially circumferential rounded elevations, thus being expanded; b) the expanded fibre bundle is subsequently drawn into an impregnation chamber; c) a melt is applied to the expanded fibre bundle; and d) the fibre bundle impregnated with melt is drawn through a take-off die at the end of the apparatus, and a corresponding device, which achieves very good impregnation quality.

20 Claims, 1 Drawing Sheet

(56) References Cited

U.S. PATENT DOCUMENTS

| | | | |
|---|---|---|---|
| 5,895,622 A * | 4/1999 | Ramani | B05D 1/045 |
| | | | 118/308 |
| 5,989,376 A | 11/1999 | Kusy et al. | |
| 6,270,851 B1 | 8/2001 | Lee et al. | |
| 2002/0172825 A1 * | 11/2002 | Montsinger | B29C 48/156 |
| | | | 428/292.1 |
| 2005/0221085 A1 * | 10/2005 | Lo | B29B 15/127 |
| | | | 428/375 |
| 2012/0048082 A1 * | 3/2012 | Silva | B26D 1/1435 |
| | | | 83/408 |
| 2014/0191436 A1 | 7/2014 | Johnson et al. | |

FOREIGN PATENT DOCUMENTS

| | | |
|---|---|---|
| EP | 1 172 191 A1 | 1/2002 |
| JP | 2005-305933 A | 11/2005 |
| JP | 2007-276193 A | 10/2007 |
| WO | 2012/149129 A1 | 11/2012 |
| WO | 2014/140025 A1 | 9/2014 |
| WO | WO 2014/171016 A1 | 10/2014 |

OTHER PUBLICATIONS

Cambridge Dictionary definition of "radially", https://dictionary.cambridge.org/us/dictionary/english/radially, accessed May 8, 2020 (Year: 2020).*

International Search Report and Written Opinion dated Jun. 23, 2016 in PCT/EP2016/058636 filed Apr. 19, 2016.

* cited by examiner

PROCESS AND DEVICE FOR THE PRODUCTION OF A FIBER-COMPOSITE MATERIAL

The present invention relates to a process and a device for the production of composite materials where one or more fibre bundles may be gently expanded and subsequently impregnated with a melt. This process/this device also allows more cost-effective fibre types, for example composed of E glass, to be optimally expanded with minimal fibre breakage.

The spreading apart of a fibre bundle during impregnation is known. A common practice of fibre expansion is spreading apart of fibre bundles by increased deflection via various deflection bars. Depending on the number of bars, deflection angle and surface quality good results can be achieved in this way. In principle, a high level of fibre expansion is achieved by increased deflection. However, this procedure promotes breakage of individual filaments in the fibre bundle which impedes further processing and destabilizes the processing operation. By contrast, smaller deflections do not achieve complete fibre spreading. EP 0 056 703 A1 describes a process where reinforcing-fibre rovings are drawn through a thermoplastic melt into which at least one heated surface in the form of a heated spreader bar has been immersed in order to spread the rovings. In practice, however, a plurality of spreader devices is always required. The take-off forces to be applied increase greatly with the number of spreader devices, with the viscosity of the melt and with take-off speed. Since the resulting high take-off forces and the mechanical friction on the bars damage the reinforcing fibre and thus have a deleterious effect on the properties of the composite material, the available window of operation is very small. An additional factor is that impregnation quality and thus also the quality of the products decrease with increasing viscosity of the melt and increasing take-off speed. The process of EP 0 056 703 A1 therefore achieves good results only with melt viscosities up to 30 Pas and with low take-off speeds (less than 0.3 m/min).

EP 0 602 618 A1 offers another means of fine fibre expansion via an air jet which widens and homogenizes the pre-spread fibre bundles. The disadvantage of this procedure is uncontrolled individual fibre expansion, i.e. the entire fabric is fanned out by means of compressed air. It is not always possible to cover agglutinated fibre bundles in this way.

WO 92/21493 discloses a means of fibre expansion via vibrating bars. This technology is employed especially for carbon fibres. Here too there is a danger of uncontrolled fibre breakage which destabilizes the overall process.

The present invention has for its object to solve the abovementioned problems and in particular to provide a process and a device where a controlled expansion of a fibre bundle is undertaken such that even agglutinated fibre bundles are spread apart, wherein only low take-off forces shall be required so that fibre breakage is avoided to the greatest possible extent.

It has now been found that, surprisingly, this object is achieved when the fibre bundle is conducted over specially shaped deflection bars having rounded elevations, thus being expanded. The invention accordingly provides a process for the production of a composite material from unidirectional fibres and a matrix which comprises the following steps:

a) a fibre bundle is conducted radially over at least one deflection bar having radially circumferential rounded elevations, thus being deflected and expanded;

b) the expanded fibre bundle is subsequently drawn into an impregnation chamber;

c) a melt is applied to the expanded fibre bundle, d) the fibre bundle impregnated with melt is drawn through a take-off die at the end of the apparatus.

The product can then be calendered and cooled.

Process step a) is to be understood as also comprehending that a plurality of fibre bundles may each be conducted over at least one such deflection bar and that the fibre bundles are then caused to converge not later than prior to the take-off die.

The expression "fibre bundle" is to be understood as meaning a bundle of a relatively large number of individual filaments. Several thousand individual filaments are usually involved here. The fibre bundle can be composed of one roving or else of a plurality of rovings; it is preferably composed of from 1 to not more than 1000 rovings, and is particularly preferably composed of from 1 to not more than 800 rovings. In the process of the invention, these rovings are individually unwound or drawn off from packages and, prior to the spreader device or at the beginning of the spreader device, are caused to converge in such a way as to give a single fibre bundle. The term "roving" is here generally to be understood as meaning a bundle of single filaments; this bundle can be composed of a single fibre type or else of various fibre types. In principle all fibres of adequate length are suitable; it is possible to use inorganic fibres, polymer fibres, and also natural fibres. Examples of suitable fibres are metal fibres, glass fibres (e.g. made of E glass, A glass, C glass, D glass, AR glass, R glass, S1 glass, S2 glass, etc.), carbon fibres, metallized carbon fibres, boron fibres, ceramic fibres (e.g. made of $Al_2O_3$ or $SiO_2$), basalt fibres, silicon carbide fibres, aramid fibres, polyamide fibres, polyethylene fibres, polyester fibres (e.g. made of polybutyleneterephthalate), fibres made of liquid-crystalline polyester, polyacrylonitrile fibres, and also fibres made of polyimide, polyetherimide, polyphenylene sulphide, polyether ketone, polyether ether ketone, and also cellulose fibres, these having been spun by means of the viscose process and usually being termed viscose fibres, hemp fibres, flax fibres, jute fibres and the like. The cross section of the fibres may for example be circular, rectangular, oval, elliptical, or cocoon-shaped. With fibres of cross section deviating from the circular shape (for example flat glass fibres) it is possible to achieve a higher fill level of fibre in the finished part, and thus higher strength.

The matrix of the composite material can be a thermoplastic moulding composition, a thermoset, a thermoplastic-thermoset hybrid system, a thermoplastic elastomer or a crosslinked elastomer. Thermoplastic moulding compositions are composed of a thermoplastic as main constituent or sole constituent. Other constituents may for example be stabilizers, processing aids, pigments, flame retardants, other thermoplastics as blend components, impact modifiers or the like. Suitable thermoplastics are for example polyolefins (such as polyethylene or polypropylene), polyesters (such as polyethyleneterephthalate, polybutyleneterephthalate, polyarylates or liquid-crystalline polyesters), polycarbonate, polyestercarbonate, polyamides (such as PA46, PA6, PA66, PA610, PA612, PA1010, PA11, PA12, semiaromatic polyamides (PPA) or transparent polyamides for example based on linear or branched aliphatic, cycloaliphatic or aromatic dicarboxylic acids and diamines), polyarylene ether ketones (such as polyetheretherketone, polyetherketone or polyetheretherketoneketone), polyphenylenesulphide, polyetherimide, polymethylmethacrylate, polystyrene, styrene-acrylonitrile copolymers (SAN), styreneacrylonitrile-butadiene copolymers (ABS), polyacetal, polyurethane, polyimide, polysulphone, polyether sulphone, polyphenylene oxide and fluoropolymers (such as PVDF or ETFE). This melt can also comprise a solvent which is subsequently removed again. However, it is also possible instead to apply a monomer as melt which is then polymerized in situ; it is thus possible for example to produce a polyamide matrix via anionic lactam polymerization. Another variant comprises applying a polymer with comparatively low molecular weight together with a coupling agent as melt, and then carrying out a chain extension during the impregnation procedure and in particular thereafter.

Suitable thermosets are for example unsaturated polyester resins, epoxy resins, amino plastics, phenolic plastics, crosslinked polyacrylates, polyurethanes, melamine resins, vinyl ester resins and bismaleimide resins. The melt applied in the process step b) is in this case a resin-hardener mixture or any other suitable precursor, for example a prepolymer.

Suitable thermoplastic elastomers are for example TPE-O (thermoplastic elastomers based on olefin, for example PP/EPDM), TPE-V (crosslinked thermoplastic elastomers based on olefin, in particular PP/crosslinked EPDM), TPE-U (thermoplastic elastomers based on polyurethane), TPE-E (thermoplastic polyester elastomers), TPE-S (styrene block copolymers, for example SBS, SEBS, SEPS, SEEPS and MBS), and also TPE-A (polyamide elastomers).

Suitable crosslinked elastomers are obtained from a compounded rubber material which, as in the prior art, comprises a vulcanizing agent, and also optionally comprises vulcanization auxiliaries, fillers, oils, and also other conventional additions. Examples of elastomers of this type are EPDM, styrene/butadiene rubber, butyl rubber, silicone rubber, epoxy rubber, chloroprene rubber, acrylic rubber and the like.

For the purposes of the invention, the term "melt" is used for any of the flowable materials mentioned above by way of example that are applied to the fibre bundles and then provide the matrix.

The expansion in process step a) is dependent on the geometry of the end product. If the end product is a tape, the fibre bundle is expanded by a comparatively large factor. If, by contrast, the end product is relatively thick, for example has a rectangular or square cross section, the expansion of the fibre bundle based on the width of the end product may be markedly lower; it is therefore not possible to state any useful generally applicable upper limit. Depending on the geometry of the end product an expansion factor of preferably not more than 30, particularly preferably not more than 20, especially preferably not more than 14 and very particularly preferably not more than 8 may be effected in each case based on the width of the end product.

It is preferable here when the fibre bundle is expanded to an extent such that its average thickness is from 1 to 50 times the filament diameter, particularly preferably 1 to 40 times the filament diameter, especially preferably 1.5 to 35 times the filament diameter and very particularly preferably from 1.8 to 30 times the filament diameter. The averaging here is across the width of the fibre bundle. In the case of fibres with non-circular cross section, the shortest cross-sectional axis is chosen as the filament diameter. In respect of the fibre cross section, the information provided by the fibre manufacturer can be used. In the case of a mixture of various fibres, the arithmetic average based on the number of individual filaments is chosen as the filament diameter. When manufacturer information is not available, or in the case of fibres of the same type but with different geometry, for example natural fibres, the average filament diameter is determined by a scanning electron (SEM) micrograph, measurement and calculation of the arithmetic average based on the number of individual filaments.

The deflection bar has at least two, preferably at least three and particularly preferably at least four radially circumferential rounded elevations. The elevations are arranged adjacent to one another on the deflection bar and are generally equally spaced from one another. In a preferred embodiment the elevations are arranged over the entire width of the deflection bar. In a further preferred embodiment the elevations are arranged in the region of the deflection bar over which the fibre bundle is conducted. The spacing between elevations may be varied very greatly depending on the type of the fibres and the type and amount of the size adhering to the fibres.

It is preferable when two or three deflection bars are arranged in succession while four, five, six or more deflection bars may also readily be arranged in succession when relatively thick fibre bundles or fibre bundles which are heavily sized and thus agglutinated are used. It has proven advantageous when for the first deflection bar the elevations are arranged with a relatively short spacing while for the next deflection bars the spacings may be wider. The invention also includes the case where for example the last deflection bar has no elevations. What is essential to the invention is merely that at least one of the deflection bars has the elevations more particularly described hereinbelow.

At the deflection bar the fibre bundle is deflected by an angle which is dependent inter alia on the type of the fibres and the type and amount of the size adhering to the fibres. The deflection angle is in the range from 5° to 120°, preferably in the range from 10° to 110°, particularly preferably in the range from 15° to 100° and especially preferably in the range from 20° to 90°. The deflection is generally rather weak and in many cases a deflection angle of 30° is an appropriate guideline value.

The expanded fibre bundle is subsequently drawn into the impregnation chamber. The melt is then applied to the expanded fibre bundle. This can be effected for example by drawing the fibre bundle through a melt bath. However, it is preferable when the melt is applied by means of applicator dies or with the aid of one or more distributor bars.

The preferred viscosity of the melt applied in the process of the invention is from 10 mPas to 400 Pas and particularly preferably up to 300 Pas. In the case of monomers or of prepolymers/resin-hardener systems which, after curing, give thermosets or thermoplastic-thermoset hybrid systems, viscosity is in the lower range down to 10 mPas or even lower. In the case of a melt composed of a thermoplastic moulding composition, a thermoplastic elastomer or a compounded elastomer material, viscosity is generally at least 1 Pas. According to the invention, viscosity is to be understood as meaning the zero-shear viscosity at the temperature of the process, measured in accordance with ASTM D4400 in a mechanical spectrometer.

Application of the melt is preferably effected without any excess of melt, particularly in the case of relatively high-viscosity melts, or using only a small excess of melt. When an excess of melt is used, precautions must be taken to ensure that the excess melt can flow out through an aperture provided for this purpose. The ratio of fibres to melt is adjusted in such a way that the volume fraction of the fibres in the finished part is about 10% to 85%, preferably 15% to 80% and particularly preferably 20% to 75%.

In the impregnation step which follows, the applied melt penetrates into the spaces between the fibres. This is promoted by local differential pressures and by relative motion of the fibres. Suitable measures therefor are for example a cross-sectional narrowing, a deflection around a radius and/or shaping prior to and in the take-off die. In principle any measure known from the prior art may be used here.

The take-off die does not generally comprise any integrated take-off equipment. Instead, tension is usually applied to the strand by a take-off directly after the die, or by calender rolls. This type of take-off is prior art, for example in the form of rollers or rolls, as also are calenders.

Take-off speed can be adjusted as required. It is preferably from 0.1 to 30 m/min and particularly preferably from 0.5 to 25 m/min.

The strand obtained in the process of the invention can have any desired geometry. It may be for example a thin sheet or other sheet, a tape, a round profile, a rectangular profile or a complex profile.

In one variant of this process, the strand obtained comprising a thermoplastic matrix is chopped to give elongate long-fibre-reinforced pellets of 4 to 60 mm, preferably 5 to 50 mm, particularly preferably 6 to 40 mm, especially preferably 5 to 30 mm and very particularly preferably 6 to 25 mm in length. These pellets can then be used to produce mouldings by means of injection moulding, extrusion, compression moulding or other familiar shaping processes, and particularly good properties of the moulding are achieved here with gentle processing methods. In this context the term "gentle" is to be understood as meaning especially that undue fibre breakage and attendant severe reduction in fibre length is largely avoided. In the case of injection moulding this means that it is preferable to use screws of large diameter and low compression ratio and also generously dimensioned nozzle channels and gate channels. A supplementary condition that should be ensured is that the elongate pellets melt rapidly with the aid of high cylinder temperatures (contact heating), and that the fibres are not excessively comminuted by undue levels of shear. When these measures are observed, the mouldings obtained have higher average fibre length than comparable mouldings produced from short-fibre-reinforced moulding compositions. This achieves a significant improvement in properties, in particular tensile modulus of elasticity, ultimate tensile strength and notched impact resistance.

Figure 1:
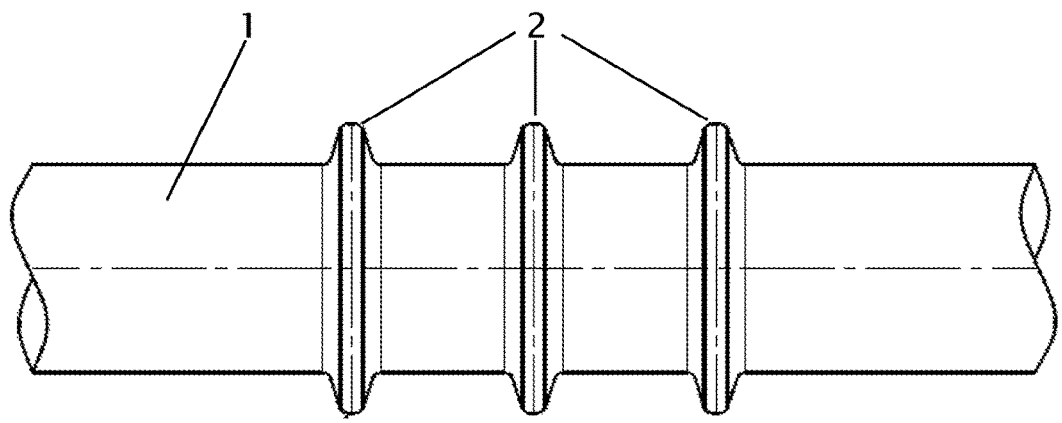
FIG. 1 depicts a deflection bar of the invention.

The deflection bar 1 depicted in FIG. 1 has three radially circumferential elevations 2 which in this case are arranged in the region of the deflection bar over which the fibre bundle is conducted.

Figure 2:
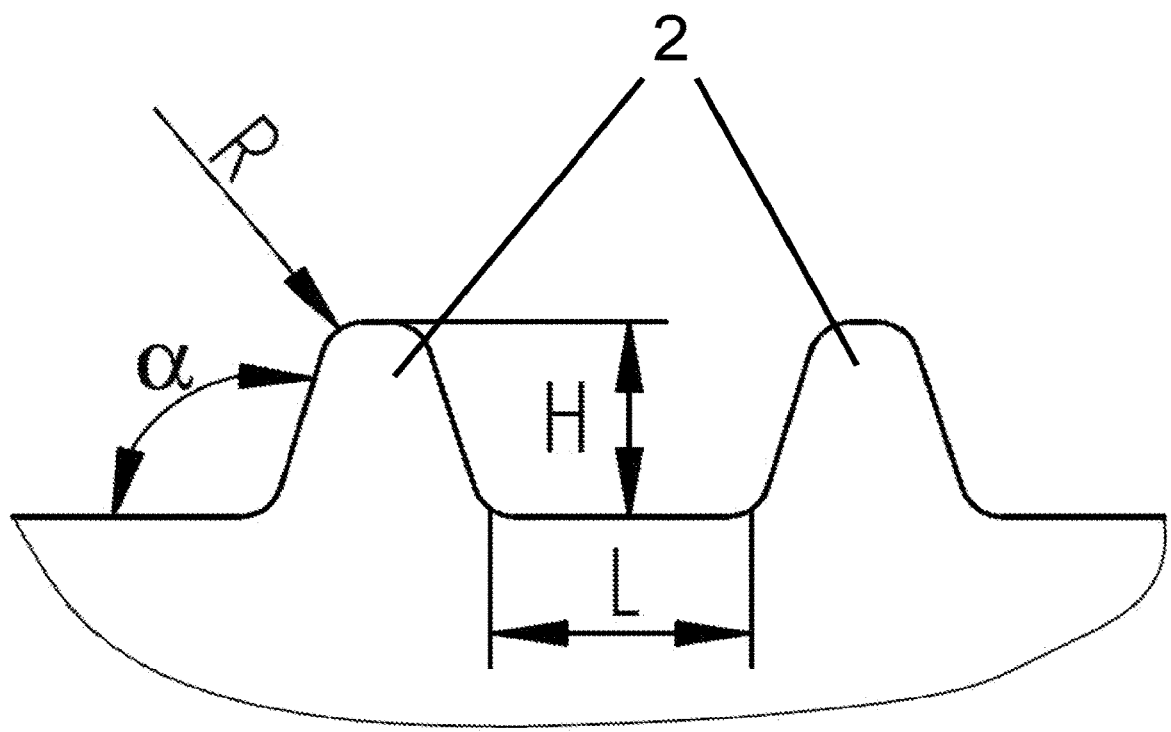
FIG. 2 shows two adjacent elevations in detail.

FIG. 2 more particularly illustrates two elevations 2. The elevations have a flank angle α, a height H and a rounded tip with a radius R. Located between the elevations is a straight section of length L which may be for example from 0.5 times to 6 times the original rovings width. The flank angle α is preferably 90.1° to 100°, particularly preferably 90.3° to 95° and especially preferably 90.5° to 92° while the height H is preferably 0.2 mm to 20 mm, particularly preferably 0.5 mm to 10 mm, especially preferably 1 mm to 6 mm and very particularly preferably 2 mm to 4 mm. The radius R is preferably 0.1 mm to 10 mm, particularly preferably 0.1 mm to 5 mm and especially preferably 0.2 to 2 mm. The radius is based on the rounding of the tip.

A particularly advantageous embodiment of the invention comprises employing the deflection bar of the invention in the process described in the European patent application having filing number 14200411.8 of 29 Dec. 2014. This process comprises the following steps:

a) a fibre bundle is conducted radially over at least one deflection bar having radially circumferential rounded elevations, thus being deflected and expanded to a width greater than the width of the end product at least by a factor of 1.2, preferably at least by a factor of 1.4 and particularly preferably at least by a factor of 1.6;

b) the expanded fibre bundle is subsequently drawn into an impregnation chamber;

c) in the expanded state a melt is applied by means of at least one applicator die;

c') by virtue of a cross-sectional narrowing, the apparatus brings the wetted fibre bundle towards the later product cross section, i.e. towards the cross section with which the product leaves the take-off die;

c") a radius deflects the wetted fibres by an angle of 5° to 60°, preferably 8° to 50°, particularly preferably 12° to 40° and especially preferably 15° to 35°;

c''') a relaxation zone uniformizes the fibre distribution to a consistent height;

d) the fibre bundle impregnated with melt is drawn through a take-off die at the end of the apparatus.

The cross-sectional narrowing in process step c') leads to a reduction in the spreading apart of the wetted fibre bundle; i.e. the width thereof is brought towards the width of the take-off die. In the preferred embodiment the width of the wetted fibre bundle is brought to the width of the take-off die. In a second possible embodiment the width of the wetted fibre bundle is brought to a width that is greater than the width of the take-off die. In this case the width of the wetted fibre bundle is further reduced on the way to the take-off die or in the take-off die. In a third possible embodiment the width of the wetted fibre bundle is brought to a width that is smaller than the width of the take-off die. In this case the width of the wetted fibre bundle is increased again by renewed spreading apart on the way to the take-off die. The cross-sectional narrowing in process step c') is preferably carried out such that for all embodiments considered here the width of the wetted fibre bundle is reduced at least by a factor of 1.2, and particularly preferably at least by a factor of 1.4.

In process step c") the radius of the deflection is preferably 2 to 90 mm, particularly preferably 3 to 60 mm, especially preferably 4 to 40 mm and very preferably 4 to 30 mm. Variations in geometry are possible; for example at the deflection point the radius can be combined with a short elevation or the fibre bundle is conducted along a Z-shaped path at the deflection point. These variations in geometry may be described such that two changes in direction follow in direct succession, a turning point lying therebetween. In this case the radius in the claims and the angle in the claims apply to the second change in direction and preferably also to the first change in direction. The first and second radius, and also the first and second angle, may differ.

The deflection point is preferably located at the end of the cross-sectional narrowing; it may, however, also be disposed prior to the end of the cross-sectional narrowing or after the end of the cross-sectional narrowing although it must then be expected that optimal impregnation quality may not be achieved.

If melt applied comprises a resin-hardener system, a monomer or a prepolymer, the hardening reaction typically takes place predominantly in the relaxation zone. The drawn off strand is then already substantially hardened.

The length of the relaxation zone depends for example on melt viscosity, intended take-off speed and plant size. For example, in the case of a laboratory plant producing a tape of 40 mm in width from E glass or S glass and PA12, a length of 100 mm achieves very good results. However, this is only an indication. The relaxation zone may also be shorter or else markedly longer.

With regard to further details concerning the process, the device and advantages, reference is made to the disclosure of the European patent application having filing number 14200411.8 of 29 Dec. 2014 and the publication resulting therefrom; this disclosure is expressly incorporated into the present patent application.

A further particularly advantageous embodiment of the invention comprises employing the deflection bar of the invention in the process described in the European patent application having filing number 15162335.2 of Feb. 4, 2015. This process comprises the following steps:

a) one or more fibre bundles are conducted radially over one or more spreader devices each comprising at least one deflection bar having radially circumferential rounded elevations, thus being deflected and expanded;

b) the one or more expanded fibre bundle(s) are then drawn into an impregnation chamber in such a way as to give at least two superposed, spatially separate and expanded fibre webs;

c) a melt is applied to the expanded fibre bundles, melt being supplied via horizontal distributor bars which are each arranged between two fibre webs;

c') the individual fibre webs are caused to converge in such a way that they are superposed and contact one another;

d) the converged fibre webs impregnated with melt are drawn through a take-off die at the end of the apparatus.

The fibre bundle is expanded and conducted in such a way as to give, at the latest upon melt application, at least two superposed webs. Web separation can take place in the apparatus or else prior to the apparatus.

In a preferred embodiment at least two fibre bundles are each separately expanded via a spreader device and drawn through separate apertures into the impregnation chamber. Two spatially separate fibre webs are thus obtained directly.

The fibre bundles, the spreader devices and the intake apertures are advantageously superposed so that the fibre webs need not be deflected. In specific cases, however, the arrangement of the fibre bundles, the spreader devices and the intake apertures can also be different, thus deflecting the fibre webs into the appropriate position.

In a further preferred embodiment at least two fibre bundles are each separately expanded via a spreader device and drawn through a common aperture into an impregnation chamber. Upon entry into the impregnation chamber, the individual fibre webs are divided again. The division of the previously separated webs can be achieved by manual threading in the opened apparatus. Preference is therefore given to an at least two-part apparatus that is easy to open.

In another embodiment, a fibre bundle is expanded via a spreader device and here or hereafter is separated by a suitable device into a plurality of superposed, spatially separate and spread fibre webs. However, the separated fibre webs here require deflection. The fibre webs are then drawn into an impregnation chamber. In one variant hereof two or more fibre bundles are each separately expanded via a spreader device, and here or hereafter each separated by a suitable device into a plurality of superposed, spatially separate and spread fibre webs, these being deflected and then drawn into an impregnation chamber.

It will be appreciated that any desired combinations of these different embodiments are also possible.

The wetting procedure now takes place between the respective fibre webs, a distributor cross section serving to introduce the melt fraction. Depending on the later desired product properties, and also on the starting materials used, the arrangement can comprise one or more melt distributors which are preferably superposed. Melt is supplied from an extruder, or from a melt pump downstream of a plastifying unit, to a distributor bar which meters the polymer uniformly over the cross section of the web. This uniform metering is achieved by way of the internal cross section of the applicator die. The geometry of the distributor die provides uniform application of the melt in that there is a die aperture or a plurality of adjacent die apertures preferably present over the entire width of the fibre webs. A T-bar distributor can be used here, or a manifold distributor, or similar types that permit controlled metering, and also uniform application of the melt film. These distributor dies are known to the person skilled in the art. A suitable manifold distributor is described in more detail in WO 2012/149129 for example. The cross section of the distributor bar may be for example round, oval, elliptical, rectangular or rounded-rectangular.

For the purposes of the invention it is additionally possible to apply further melt via one or two applicator dies, where the arrangement has either an applicator die above the uppermost fibre web, an applicator die below the undermost fibre web, or respectively an applicator die above the uppermost fibre web and below the undermost fibre web.

In the impregnation step that follows, the various webs are caused to converge and are drawn through a die. In the chamber region between melt application and die, assistance can be provided by the presence of a slight excess of melt. In this region the fibre webs converge, and the applied melt penetrates into the spaces between the fibres where impregnation has not yet taken place. This procedure is promoted by local differential pressures that can be caused by the convergence in the die region. In the region of the chamber, the convergence can also be assisted by the chamber geometry, or by an insert introduced in the form of a cross-sectional narrowing. In this case, the fibres are subjected to preconsolidation with melt in a preliminary stage, the remaining consolidation then being carried out by the die. If the end product is a thin sheet it is likely that no cross-sectional narrowing is required but if it is a profile the cross section is reduced from that of an expanded fibre web to that corresponding to the shape of the profile.

The take-off die carries out the initial shaping, and brings about further impregnation of the web product. It does not generally comprise any integrated take-off equipment. Instead, tension is usually applied to the strand by a take-off directly after the die, or by calender rolls. This type of take-off is prior art, for example in the form of rollers or rolls, as also are calenders. This can effect further shaping.

When the melt applied is a resin-hardener system, a monomer or a prepolymer, the hardening reaction takes place in the die region, and also thereafter. In this case, the die region may be longer. Either melt application is quantitatively appropriate or the die acts as a stripper and hardening occurs only subsequently. The temperature profile must be chosen such that hardening can take place only after the die region. After take-off from the die, the product is optionally subjected to thermal post treatment, for example in an oven, for completion of hardening.

With regard to further details concerning the process, the device and advantages, reference is made to the disclosure of the European patent application having filing number 15162335.2 of 2 Apr. 2015 and the publication resulting therefrom; this disclosure is expressly incorporated into the present patent application.

The invention also provides a device for the production of a fibre-composite material which comprises the following elements:

a) a spreader device comprising one or more successive deflection bars which have radially circumferential rounded elevations and over which a fibre bundle may be radially conducted, deflected and expanded;

b) one or more intake regions into an impregnation chamber;

c) a downstream device for application of melt to the expanded fibre bundle, d) a subsequent zone for impregnation of the fibre bundle and e) a take-off die.

Details of this device are apparent from the process description above since the device is used for carrying out the process of the invention.

In a particularly advantageous embodiment thereof the device comprises the following elements:

a) a spreader device comprising one or more successive deflection bars which have radially circumferential rounded elevations and over which a fibre bundle may be radially conducted, deflected and expanded to a width greater than the width of the end product at least by a factor of 1.2, preferably at least by a factor of 1.4 and particularly preferably at least by a factor of 1.6, b) one or more intake regions into an impregnation chamber;

c) one or more downstream applicator dies with which the melt may be applied to the expanded fibre bundle, d) a subsequent zone for impregnation of the fibre bundle which comprises the following successive regions:

a cross-sectional narrowing of the transport channel, with which the wetted fibre bundle may be brought towards the later product cross section, a deflection point providing deflection of 5° to 60°, preferably of 8° to 50°, particularly preferably of 12° to 40° and especially preferably of 15° to 35° and a relaxation zone and e) a take-off die.

Details concerning this embodiment are apparent from the process description above, from the disclosure of the European patent application having filing number 14200411.8 of 29 Dec. 2014 and from the publication resulting therefrom.

In a further particularly advantageous embodiment the device comprises the following elements:

a) a spreader device comprising one or more successive deflection bars which have radially circumferential rounded elevations and over which a fibre bundle may be radially conducted, deflected and expanded in such a way as to give at least two superposed, spatially separate fibre webs;

b) one or more intake regions into an impregnation chamber;

c) a downstream device for application of melt to the expanded fibre bundle in the form of a horizontal distributor bar which is arranged such that it is located between two fibre webs and by means of which melt may be applied;

d) a subsequent zone for impregnation of the fibre bundle which comprises a convergence region, and e) a take-off die.

Details concerning this embodiment are apparent from the process description above, from the disclosure of the European patent application having filing number 15162335.2 of 2 Apr. 2015 and from the publication resulting therefrom.

The deflection bar of the invention achieves uniform expansion even of heavily sized fibre bundles breaking apart in particular even agglutinated regions. The conditions necessary to achieve a very good impregnation quality across a very wide viscosity range even when take-off speed is high are accordingly met. This applies all the more in cooperation with the measures during melt application and subsequent consolidation that would be selected by those skilled in the art to achieve the best possible fibre wetting.

The invention claimed is:

1. A process for producing a fiber-composite material from unidirectional fibers and a matrix in an apparatus, the process comprising:

a) conducting a fiber bundle radially over at least one deflection bar having a plurality of radially circumferential rounded elevations, thereby deflecting and expanding the fiber bundle to a width greater than a width of the end product at least by a factor of 1.2;

b) subsequently drawing the expanded fiber bundle into an impregnation chamber;

c) applying a melt to the expanded fiber bundle; and d) drawing the fiber bundle impregnated with the melt through a take-off die at the end of the apparatus, wherein each of the radially circumferential rounded elevations has a flank angle $\alpha$ of 90.1° to 100°, the fiber bundle comprises from 1 to 1,000 rovings, the at least one deflection bar has a straight section of length L between adjacent two radially circumferential rounded elevations in the plurality of radially circumferential rounded elevations, the length L being from 0.5 times to 6 times a width of the roving, and the fiber-composite material is a thin sheet or other sheet, a tape or a rectangular profile.

2. The process of claim 1, wherein the matrix of the fiber-composite material is a thermoplastic moulding composition, a thermoset, a thermoplastic-thermoset hybrid system, a thermoplastic elastomer or a crosslinked elastomer.

3. The process of claim 1, wherein in a) the fiber bundle is expanded such that an average thickness of the expanded fiber bundle in a radial direction is from 1 to 50 times a diameter of filament in the fiber bundle.

4. The process of claim 1, wherein the fiber-composite material is calendered after leaving the take-off die.

5. The process of claim 1, wherein the fiber-composite material is chopped to give elongate long-fiber-reinforced pellets of 4 to 60 mm in length.

6. The process of claim 1, wherein:

in c) the melt is applied by means of at least one applicator die;

a wetted fiber bundle is brought towards a later product cross section by virtue of a cross-sectional narrowing;

a radius deflects wetted fibers by an angle of 5° to 60°; and a height of the fiber distribution is uniformized radially in a relaxation zone.

7. The process of claim 1, wherein:

in a) one or more fiber bundles are expanded via one or more spreader devices each comprising at least one deflection bar having radially circumferential rounded elevations;

in b) at least one expanded fiber bundle is then drawn into an impregnation chamber in such a way as to give at least two superposed, spatially separate and expanded fiber webs; and in c) the melt is supplied via horizontal distributor bars which are each arranged between two fiber webs; and individual fiber webs are caused to converge in such a way that they are superposed and contact one another.

8. The process of claim 1, wherein each of the radially circumferential rounded elevations has a height H of 0.2 mm to 20 mm.

9. The process of claim 1, wherein each of the radially circumferential rounded elevations has a rounded tip with a radius R of 0.1 mm to 10 mm.

10. The process of claim 1, wherein the flank angle α of the radially circumferential rounded elevations is 90.3° to 95°.

11. The process of claim 1, wherein the flank angle α of the radially circumferential rounded elevations is 90.5° to 92°.

12. The process of claim 6, wherein, in c), the radius deflects the wetted fibers by an angle of 12° to 60°.

13. The process of claim 6, wherein, in c), the radius deflects the wetted fibers by an angle of 15° to 60°.

14. The process of claim 1, wherein in a), the at least one deflection bar comprises at least four deflection bars each having the plurality of radially circumferential rounded elevations, and the fiber bundle is conducted radially over the at least four deflection bars arranged in succession.

15. The process of claim 1, wherein the fiber bundle comprises one roving.

16. The process of claim 1, wherein in d), the fiber bundle impregnated with the melt is drawn through the take-off die at a take-off speed of from 0.5 to 25 m/min.

17. The process of claim 1, wherein the take-off die comprises a plurality of rollers or rolls.

18. The process of claim 1, wherein the fiber-composite material comprises 20% to 75% by volume of the fibers.

19. A process for producing a fiber-composite material from unidirectional fibers and a matrix in an apparatus, the process comprising:
   a) conducting a fiber bundle radially over at least one deflection bar having a plurality of radially circumferential rounded elevations, thereby deflecting and expanding the fiber bundle;
   b) subsequently drawing the expanded fiber bundle into an impregnation chamber;
   c) applying a melt to the expanded fiber bundle; and
   d) drawing the fiber bundle impregnated with the melt through a take-off die at the end of the apparatus,
   wherein each of the radially circumferential rounded elevations has a flank angle α of 90.1° to 100°,
   the fiber bundle comprises from 1 to 1,000 rovings,
   the at least one deflection bar has a straight section of length L between adjacent two radially circumferential rounded elevations in the plurality of radially circumferential rounded elevations, the length L being from 0.5 times to 6 times a width of the roving, and
   the fiber-composite material is a thin sheet or other sheet, a tape or a rectangular profile.

20. The process of claim 14, wherein in a), the fiber bundle is conducted radially over the at least four deflection bars each having the plurality of radially circumferential rounded elevations, and then over a deflection bar having no elevation.

* * * * *